(No Model.)
A. P. WRIGHT.
CONDUIT FOR ELECTRIC WIRES.
No. 444,477. Patented Jan. 13, 1891.
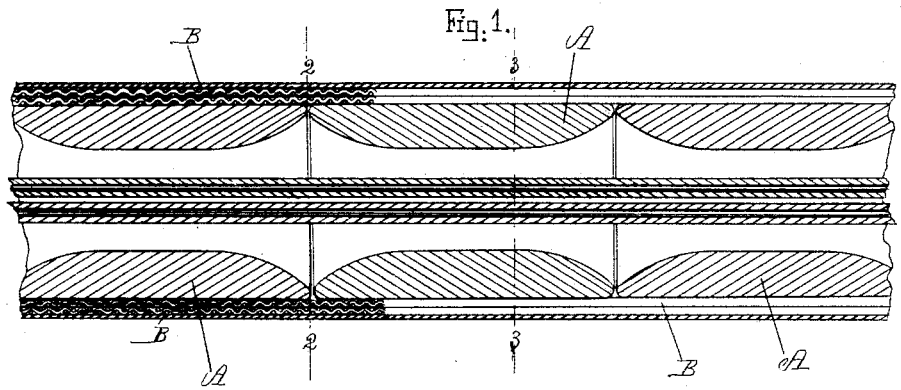
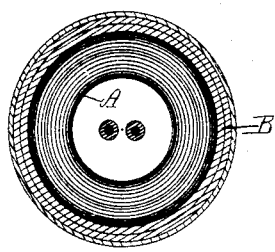
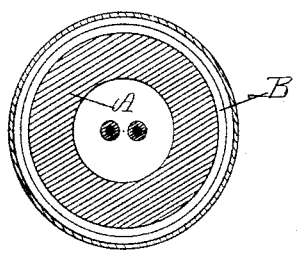
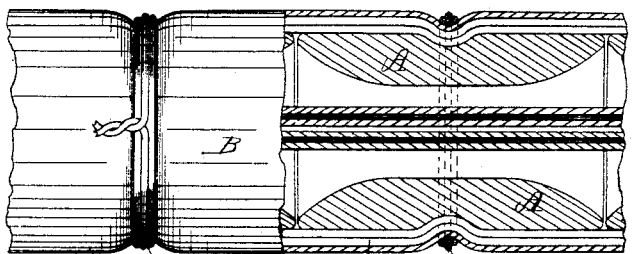
Witnesses.
Inventor.
Alex. Patrick Wright
by his attorneys
Maynadier & Rea

UNITED STATES PATENT OFFICE.

ALEXANDER P. WRIGHT, OF BOSTON, ASSIGNOR, BY DIRECT AND MESNE ASSIGNMENTS, TO ARTHUR LORD, TRUSTEE, OF PLYMOUTH, MASSACHUSETTS.

CONDUIT FOR ELECTRIC WIRES.

SPECIFICATION forming part of Letters Patent No. 444,477, dated January 13, 1891.

Application filed April 18, 1890. Serial No. 348,569. (No model.)

*To all whom it may concern:*

Be it known that I, ALEXANDER PATRICK WRIGHT, of Boston, Suffolk county, Massachusetts, have invented a new and useful Conduit for Electrical Conductors, of which the following is a specification, reference being had to the accompanying drawings, in which—

Figure 1 is a lengthwise section of a short length of my conduit. Figs. 2 and 3 are cross-sections on lines 2 2 and 3 3 of Fig. 1. Fig. 4 is an elevation showing a construction which adapts the conduit to be cut into lengths.

It is desirable in many places, especially in wiring houses, to have the electrical conductors in conduits or pipes, and my invention relates to conduits which are especially adapted for that use, but are of course of more general application.

My invention is a conduit formed of short tubes which are held end to end by means of a flexible pipe or hose, the whole forming a flexible conduit, one of whose advantages is that it is readily drawn into place behind the plastering. It is also strong and in all respects admirably adapted for the reception of electrical conductors.

In the drawings, A represents short tubes of porcelain or other proper material. These tubes are preferably non-conductors of electricity and shaped, as shown, so that when put together end to end each will move readily with relation to the other far enough to give flexibility to the finished conduit and yet not interfere with the introduction of conductors—that is, the bore of one tube cannot get crosswise of the bore of the neighboring tubes. These tubes are held together by the flexible pipe B, which is preferably manufactured in place on the tubes A; but of course a suitable hose may be packed with these tubes, especially when some of them are formed with a groove, as shown in Fig. 4, by means of which the hose B may be firmly secured to the tube A, so grooved by a binder *a*. In all cases I prefer to use a pair of grooved tubes every yard or two in the length of the conduit, so that it may be cut into suitable lengths, as will be clear from Fig. 4. Of course all the tubes may be grooved, if desired, and with proper machinery for weaving the hose in place and contracting it about the grooves this is desirable; but where wire or cord binders *a* are used it answers well to secure the hose B to the tubes A only at such intervals in the length of the conduit as will answer for adapting the conduit to be cut into lengths.

The hose or flexible pipe B is preferably water-proofed by a rubber covering; but that is a matter too well known to require description.

I am aware of Letters Patent No. 283,763, of 1883, and No. 421,781, of 1890, also the British Patent No. 800, of 1861, and disclaim all that is shown in them, my conduit consisting of a flexible tube or pipe lined with short tubes, each of which is independent of its neighboring tubes and each of which is flared at both ends. The beads, disks, or tubes of Patents Nos. 283,763 and 421,781 and of the British Patent are strung upon the conductor, and the bore of these beads, disks, or tubes are substantially uniform, except in Patent No. 421,781, where the tubes are not independent, but articulated—that is, a portion of one tube fits into a socket formed in the other tube to receive it. In short, the main function of the parts comprising my conduit or compound tube is to preserve the bore so that a flexible wire passed endwise into my compound tube will be guided by the small central part of the bore of each short tube into the mouth of the next short tube, even when the compound tube is bent, and hence the articulation of the short tubes, as in Patent No. 421,781, or in any other way, must be avoided in making my conduit or compound tube, and the difference in diameter between the middle and end portions of the bore of the short tubes must be large, instead of merely that slight flare which enables the tubes to be strung more readily upon a wire or which enables the tube to move somewhat upon a wire which fills the middle part of its bore.

What I claim as my invention is—

1. A conduit for electrical conductors, made up of a number of short tubes A, having an inner diameter at the ends greater than at the middle portion and each independent of the others, and a flexible pipe B, the pipe B holding the tubes A end to end, and the whole constituting a conduit substantially such as described.

2. A conduit for electrical conductors, made up of a number of tubes A, some of which are grooved substantially as described, held together by a flexible pipe B, which is contracted to fill the grooves about the grooved tubes, all substantially as described.

ALEX. P. WRIGHT.

Witnesses:
J. E. MAYNADIER,
JOHN R. SNOW.